US010362891B2

(12) United States Patent
Chameroy et al.

(10) Patent No.: US 10,362,891 B2
(45) Date of Patent: Jul. 30, 2019

(54) PRESSURE-COOKING UTENSIL PROVIDED WITH A LOCKING/UNLOCKING CONTROL MEMBER THAT OPERATES ASYMMETRICALLY

(75) Inventors: Eric Chameroy, Veronnes (FR); Michel Pierre Cartigny, Mirebeau (FR)

(73) Assignee: SEB S.A, Ecully (FR)

( * ) Notice: Subject to any disclaimer, the term of this patent is extended or adjusted under 35 U.S.C. 154(b) by 896 days.

(21) Appl. No.: 13/142,788

(22) PCT Filed: Dec. 16, 2009

(86) PCT No.: PCT/FR2009/052574
§ 371 (c)(1),
(2), (4) Date: Sep. 27, 2011

(87) PCT Pub. No.: WO2010/076507
PCT Pub. Date: Jul. 8, 2010

(65) Prior Publication Data
US 2012/0012584 A1  Jan. 19, 2012

(30) Foreign Application Priority Data
Dec. 30, 2008 (FR) ...................................... 08 59148

(51) Int. Cl.
*A47J 27/08* (2006.01)
*A47J 27/09* (2006.01)
*B65D 45/34* (2006.01)

(52) U.S. Cl.
CPC ........... *A47J 27/0813* (2013.01); *A47J 27/09* (2013.01); *B65D 45/34* (2013.01)

(58) Field of Classification Search
CPC ...... B65D 43/00; B65D 45/34; A27J 27/0813; A27J 27/09

(Continued)

(56) References Cited

U.S. PATENT DOCUMENTS 6,067,896 A * 5/2000 Elorza ............................. 99/337
6,135,013 A * 10/2000 Barrena ................... A47J 27/09
220/203.01

FOREIGN PATENT DOCUMENTS

EP  0 611 540 A  8/1994
FR  2 863 849 A  6/2005

OTHER PUBLICATIONS

International Search Report mailed by the International Searching Authority (ISA/EP) dated Apr. 23, 2010 in connection with PCT International Application No. PCT/FR2009/052574, filed Dec. 16, 2009.

* cited by examiner

*Primary Examiner* — Andrew T Kirsch
(74) *Attorney, Agent, or Firm* — John P. White; Cooper & Dunham LLP

(57) ABSTRACT

The invention relates to a food-cooking utensil including:
locking/unlocking means; and
a control member (6) for controlling the movement of said locking/unlocking means;
the control member (6) and the locking/unlocking means co-operating so that the position of the locking/unlocking means varies as a function of the position of the control member (6) in a first relationship while the control member (6) is being moved from its locking position towards its unlocking position, and so that the position of the locking/unlocking means varies as a function of the position of the control member (6) in a second relationship while the control member (6) is being moved from its unlocking position towards its locking position. Food pressure cooking devices.

20 Claims, 5 Drawing Sheets

(58) Field of Classification Search
USPC .......................................................... 220/262
See application file for complete search history.

PRESSURE-COOKING UTENSIL PROVIDED WITH A LOCKING/UNLOCKING CONTROL MEMBER THAT OPERATES ASYMMETRICALLY

This application is a § 371 national stage of PCT International Application No. PCT/FR2009/052574, filed Dec. 16, 2009, claiming priority of French Patent Application No. 0853148, the entire contents of which are hereby incorporated by reference into this application.

TECHNICAL FIELD

The present invention relates to the general technical field of cooking utensils, and in particular of household pressure-cooking utensils, of the pressure cooker type, such a utensil comprising a vessel and a lid designed to be locked onto the vessel to form a substantially sealed cooking enclosure, and being designed to enable food contained in the vessel to be cooked under pressure.

The present invention relates more particularly to a food-cooking utensil comprising:

a vessel and a lid;
locking/unlocking means mounted to move between a locked position in which they lock the lid relative to the vessel and an unlocked position in which the lid is free relative to the vessel; and
control member for controlling the movement of said locking/unlocking means, said control member itself being mounted to move between a locking position and an unlocking position, which positions correspond respectively to the locked and to the unlocked positions of said locking/unlocking means;
the control member and the locking/unlocking means co-operating so that the instantaneous position of the locking/unlocking means varies as a function of the instantaneous position of the control member in a first relationship while the control member is being moved from its locking position towards its unlocking position.

STATE OF THE PRIOR ART

Pressure-cooking utensils are already known that comprise a vessel and a lid designed to be locked onto the vessel via locking/unlocking means suitable for going between a locked position in which said locking/unlocking means lock the lid on the vessel, and an unlocked position in which the lid is free relative to the vessel and vice versa. For example, such locking/unlocking means implement a plurality of locking jaws secured to drive arms that are disposed radially over the lid, and that are caused to move by a control member mounted on the lid. The user can thus actuate the control member to cause the jaws to move radially, either outwards or inwards, so as to position the jaws respectively in the unlocking position or in the locking position.

In particular, a pressure-cooking utensil is known whose locking/unlocking control member is constituted by a central knob mounted to move in rotation on the lid about an axis of rotation that is perpendicular to the mean plane in which the lid extends. The user can thus use a single control member to cause the jaws to move radially inwards and outwards by turning the central knob manually respectively clockwise and anticlockwise.

Such a design is particularly advantageous insofar as it enables the user to use the same control member both to lock and to unlock the lid relative to the vessel.

That prior art pressure cooker is generally satisfactory. Nevertheless it could be further improved.

The great simplicity of design of that known utensil can give rise to certain user errors. Such errors can, in particular, stem from the extreme proximity between the action that the user has to perform to lock the lid, and the action that the user has to perform to unlock the lid. The locking drive movement for locking that prior art utensil is strictly symmetrical to the unlocking drive movement. Thus, rotation clockwise through a stroke of about 45° makes it possible to move the jaws progressively in an outward radial direction until they reach the unlocking position, and the lid is locked by the same, single control member being moved in rotation through the same angular amplitude but anticlockwise, thereby moving the jaws progressively in the inward radial direction until they reach their locking position. That great proximity between the locking drive movement and the unlocking drive movement can therefore lead to confusion for the user, who might, despite suitable visible identifiers, think that the utensil has been locked whereas in fact the user has unlocked it, and vice versa.

Furthermore, proper locking and unlocking of the lid is directly dependent on the single control member being moved in rotation through its entire stroke. In other words, if, for example, the user turns the single control member through an angular stroke of 40° instead of the 45° necessary for fully locking the utensil, it is possible that the utensil might not be fully locked, which would then prevent the cooking cycle from taking place normally.

Finally, it should be noted that the sensation experienced by the user on handling the single control member is strictly the same, except for rotation direction, whether the user is locking or unlocking the lid.

For the user, this can constitute a factor of confusion and of concern insofar as the user can have doubts (grounded or otherwise) as to whether the desired locking or unlocking has really been achieved.

OBJECT OF THE INVENTION

Objects assigned to the invention are consequently to remedy the various above-listed drawbacks and to propose a novel food-cooking utensil, and in particular a novel pressure cooker, that, while being of extremely simple, compact, and inexpensive construction, is easy, reliable, and reassuring to use.

Another object of the invention is to propose a novel food-cooking utensil, and in particular a novel pressure cooker, that enables the lid to be unlocked relative to the vessel in precisely controlled manner.

Another object of the invention is to propose a novel food-cooking utensil, and in particular a novel pressure cooker, that limits the risks of incomplete locking and in which operation to achieve such locking is reassuring for the user.

Another object of the invention is to propose a novel food-cooking utensil, and in particular a novel pressure cooker, that can be used with the user needing to exert only a minimum amount of physical effort.

Another object of the invention is to propose a novel food-cooking utensil, and in particular a novel pressure cooker, that makes it possible for the lid to be locked in clear-cut manner relative to the vessel.

Another object of the invention is to propose a novel food-cooking utensil, and in particular a novel pressure cooker, that is of particularly simple, compact, and robust design.

Another object of the invention is to propose a novel food-cooking utensil, and in particular a novel pressure cooker, that procures for the user a handling sensation that is very specific when locking the lid relative to the vessel.

Another object of the invention is to propose a novel food-cooking utensil, and in particular a novel pressure cooker, that is particularly practical to use.

These objects assigned to the invention are achieved by means of a food-cooking utensil comprising:
- a vessel and a lid;
- locking/unlocking means mounted to move between a locked position in which they lock the lid relative to the vessel and an unlocked position in which the lid is free relative to the vessel; and
- a control member for controlling the movement of said locking/unlocking means, said control member itself being mounted to move between a locking position and an unlocking position, which positions correspond respectively to the locked and to the unlocked positions of said locking/unlocking means;

the control member and the locking/unlocking means co-operating so that the instantaneous position of the locking/unlocking means varies as a function of the instantaneous position of the control member in a first relationship while the control member is being moved from its locking position towards its unlocking position, said utensil being characterized in that the control member and the locking/unlocking means co-operate so that the instantaneous position of the locking/unlocking means varies as a function of the instantaneous position of the control member in a second relationship that is different from the first relationship while the control member is being moved from its unlocking position towards its locking position.

BRIEF DESCRIPTION OF THE DRAWINGS

Other features and advantages of the invention appear and emerge in more detail on reading the following description given with reference to the accompanying drawings that are given by way of non-limiting and illustrative example, and in which.

BEST MANNER OF IMPLEMENTING THE INVENTION

The food-cooking utensil 1 of the invention is designed to cook various foods, preferably at a pressure level that is greater than atmospheric pressure, in which case it constitutes a pressure-cooking utensil, and preferably a pressure cooker. For reasons of conciseness, the following description is exclusively focused on such a pressure-cooking utensil, it being understood that the invention also relates to utensils for cooking at atmospheric pressure. Advantageously, the utensil 1 of the invention is designed to be brought up to pressure exclusively under the effect of a heat source (regardless of whether that source is incorporated or external), without any external pressure being contributed. Preferably, the utensil 1 is a household utensil, it being understood that the invention may also relate to professional or semi-professional utensils. The utensil 1 of the invention is thus advantageously a cooking utensil that is of a portable nature (i.e. it can be moved manually) and of an independent nature.

In conventional manner, the cooking utensil 1 of the invention includes a vessel 2 forming a cooking receptacle and advantageously being circularly symmetrical about an axis X-X'. Below, the adjective "axial" refers to the direction in which said axis of symmetry X-X' extends, which direction is the vertical direction when the utensil 1 is in normal use, i.e. is standing on a horizontal plane. In conventional manner, the vessel 2 is made of a metal material such as stainless steel, and is, for example, provided with a heat-conductive bottom 2A that is secured to the vessel by any suitable technique (e.g. by hot stamping).

The vessel 2 may also be provided with graspable members, such as handles 2B, 2C, of which there are preferably two, and that are fastened to the side wall 2D of the vessel, e.g. in diametrically opposite manner.

The utensil 1 of the invention also includes a lid 3 that is designed to be mounted and locked (by means described below) onto the vessel 2 so as to co-operate therewith to form a cooking enclosure that is substantially sealed, i.e. that is sufficiently airtight to enable the utensil 1 to be brought up to pressure. The lid 3 is advantageously disk-shaped in overall shape, and, when said lid is mounted and locked onto said vessel, it advantageously extends in a mean plane that is substantially parallel to the mean plane in which the bottom 2A of the vessel 2 extends.

Figures 1, 2:
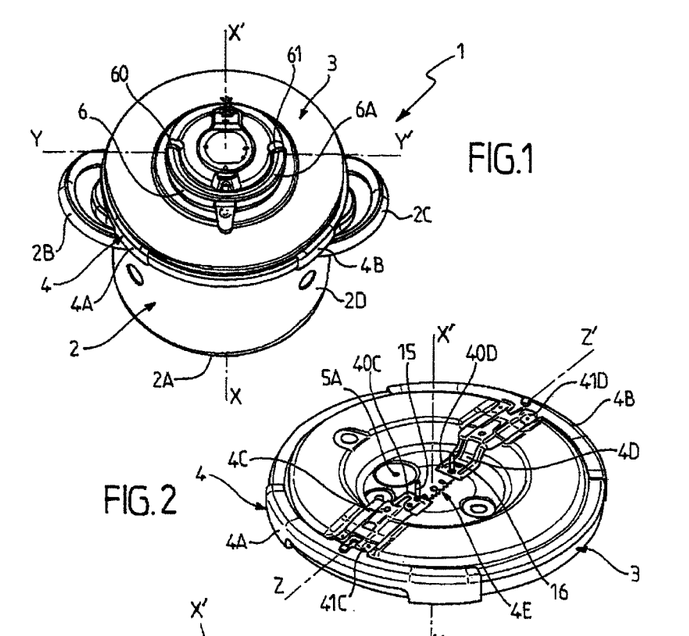
FIG. 1 is an overall perspective view of a pressure-cooking utensil of the invention with its locking/unlocking means in the locked position and its control member in the locking position.
FIG. 2 is a perspective view of an implementation detail of how the locking/unlocking means are mounted on the lid of the utensil of FIG. 1.
Figures 7, 8, 9:
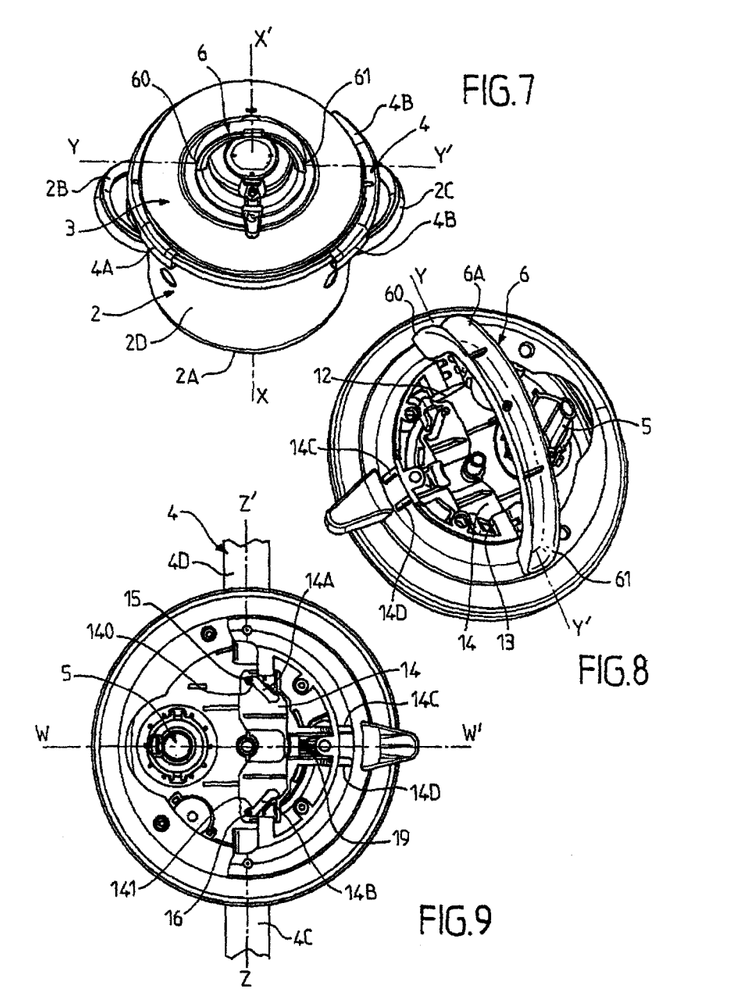
FIG. 7 is an overall perspective view of the utensil of FIGS. 1 to 6, with the control member in its unlocking position.
FIG. 8 is a perspective view of an implementation detail of the utensil shown in FIG. 7.
FIG. 9 is a view from above of the implementation detail of FIG. 8, the control member being omitted for reasons of clarity.

The utensil 1 of the invention also includes locking/unlocking means 4 for locking/unlocking the lid 3 relative to the vessel 2 and whereby the lid 3 can thus be locked or unlocked on the vessel 2. Locking the lid 3 on the vessel 2 enables the cooking enclosure to be brought up to pressure without any risk of the lid 3 coming off under the effect of the pressure. The locking/unlocking means 4 are mounted to move between a locked position (shown in FIGS. 1 and 2) in which it locks the lid 3 relative the vessel 2 and an unlocked position (shown in FIG. 7) in which the lid 3 is free relative to the vessel 2, i.e. the lid 3 is unlocked and can be freely separated from the vessel 2.

Advantageously, the locking/unlocking means 4 are mounted to slide over the lid 3 along a slide axis Z-Z'. In other words, the locking/unlocking means 4 are advantageously mounted to move in translation over the lid 3, and preferably in radial translation over said lid 3 relative to the axis X-X'.

Preferably, the locking/unlocking means 4 are locking/unlocking means having jaws or segments, it being understood that the invention is in no way limited to a particular type of locking/unlocking means 4.

In the preferred variant shown in the figures, the locking/unlocking means 4 for locking/unlocking the lid 3 relative to the vessel 2 comprises two jaws 4A, 4B mounted to move in radial translation over and relative to the lid 3 via corresponding drive arms 4C, 4D extending in diametrically opposite manner relative to the general axis of symmetry X-X' of the utensil 1. The jaws 4A, 4B are thus mounted, via the drive arms 4C, 4D, to move between firstly a locked position in which each jaw 4A, 4B clamps the lid 3 and the rolled top rim of the vessel 2 and secondly an unlocked position obtained by moving the jaws 4A, 4B outwards from their locked position and in which the jaws 4A, 4B are no longer in engagement with the rolled rim of the vessel 2, thereby enabling the lid 3 to be released from the vessel 2 freely by the user. Preferably, the locked position is a return position, such a return effect being obtained, for example, by interposing a spring 4E that interconnects the drive arms 4C, 4D and that urges them back towards each other. Each drive arm 4C, 4D extends more precisely between an inner end 40C, 40D designed to co-operate with a control member 6 (as explained in more detail below), and an outer end 41C, 41D that carries the corresponding jaw 4A, 4B. Each jaw 4A, 4B is advantageously in the form of a U-shaped metal plate as is well known to the person skilled in the art. However, it is quite possible for the outer end of each segment 4C, 4D not to carry any jaw and to be designed simply to penetrate into a corresponding slot provided in the vessel 2, in the manner of a bolt-and-keeper system. Such a locking system of the bolt-and-keeper type (not shown) that can be referred to as a "segment locking system" is well known per se, so that it is not necessary to describe it in any further detail herein.

The utensil 1 of the invention for cooking food under pressure advantageously includes pressure regulator means 5 mounted in leaktight communication with a corresponding hole 5A provided in the lid 3 and arranged so as to maintain the relative pressure (i.e. the pressure measured above atmospheric pressure) prevailing in the enclosure at a substantially constant predetermined value or "operating" pressure. The general operating principle of such regulator means 5 is well known to the person skilled in the art so that it is not necessary to describe it in any further detail herein.

Advantageously, the regulator means 5 are provided with a setting system enabling the user to select a predetermined operating pressure from a choice of a plurality of operating pressure levels, via a pressure selection member, as a function, for example, of the type of food present in the utensil 1. Advantageously, the pressure regulator means 5 are designed so that the operating pressure lies in a range extending substantially from 10 kilopascals (kPa) to 90 kPa.

As mentioned above, the food-cooking utensil 1 of the invention also has a control member 6 for controlling the movement of said locking/unlocking means 4 for locking/unlocking the lid 3 relative to the vessel 2. In other words, the control member 6 is a member for controlling locking/unlocking of the lid 3 relative to the vessel 2.

To this end, the control member 6 is advantageously designed to be operated, preferably directly and manually, by the user in a manner enabling the user to control the movement of the locking/unlocking means 4, i.e. in the variant shown in the figures, to control the radial movement of the drive arms 4C, 4D and of the corresponding jaws 4A, 4B.

Advantageously, the control member 6 is designed to enable the user to control both the locking and the unlocking of the lid 3 relative to the vessel 2, i.e. a single and common control member is available to the user, enabling the user both to lock and to unlock the lid 3 relative to the vessel 2. The use of a single control member 6 for controlling both locking and unlocking makes it possible to simplify the design and the construction of the utensil 1, while also making the utensil easier to use.

Figure 3:
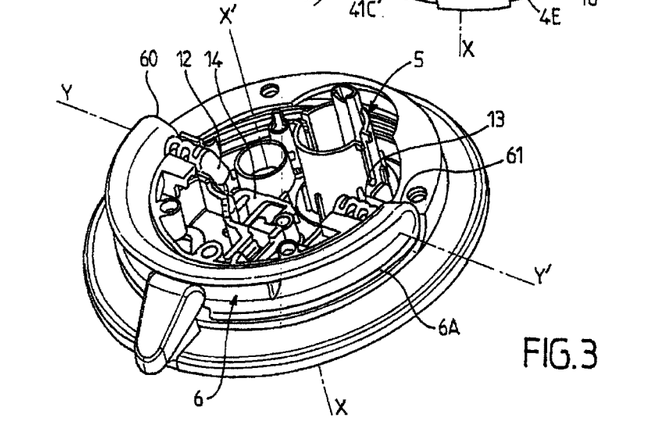
FIG. 3 is a perspective view of an implementation detail of the utensil shown in FIG. 1.

The control member 6 is mounted to move between a locking position (visible in FIGS. 1 and 3) and an unlocking position (visible in FIGS. 7 to 10) corresponding respectively to the locked position and to the unlocked position of said locking/unlocking means 4. In other words, the control member 6 is designed to be suitable for being moved manually by a user from its locking position to its unlocking position, and vice versa. The control member 6 interacts with the locking/unlocking means 4 so that when the control member 6 is in its unlocking position, the locking/unlocking means 4 are in the unlocked position, i.e. the lid 3 can be freely mounted on and removed from the vessel 2, whereas when the control member 6 is in its locking position, the locking/unlocking means 4 then take up their locked position, preventing the lid 3 from being released from the vessel 2.

Preferably, the control member 6 is mounted to pivot on the lid 3 between its locking and its unlocking positions. More precisely, the control member 6 is advantageously mounted to pivot, between its locking and its unlocking positions, about a pivot axis Y-Y'.

Said pivot axis Y-Y' preferably itself extends in a mean direction that is mainly parallel to the mean plane of extension of the lid 3. Said pivot axis Y-Y' is thus advantageously perpendicular to the axis X-X' and is preferably substantially parallel to the slide axis Z-Z' along which the locking/unlocking means 4 slide. Advantageously, said pivot axis Y-Y' and said slide axis Z-Z' lie in planes that are both substantially parallel to the mean plane in which the lid 3 extends.

Advantageously, in order to enable the lid 3 to be handled in balanced manner and in order to simplify the overall design of the utensil 1, the control member 6 is centered on the lid 3, so that the pivot axis Y-Y' then advantageously intersects the axis X-X' corresponding to the vertical direction. However, it is quite possible for the pivot axis of the control member 6 to extend in a direction other than the direction shown in the figures; e.g. the pivot axis in question may extend parallel to the axis X-X' and may even coincide therewith. Advantageously, the control member 6 is designed to move through an angular stroke substantially equal to 90° between a folded-away position, corresponding to the locking position, in which the angle formed between the mean plane of extension of the lid 3 and the mean plane of extension of the control member 6 is substantially zero, and an unfolded or deployed position, corresponding to the unlocking position, in which the angle between the mean plane of extension of the lid 3 and the mean plane of extension of the control member 6 is substantially 90°.

Advantageously, the control member 6 comprises a carrying handle 6A, i.e. a preferably arcuate loop-shaped piece, advantageously designed to be taken hold of firmly and held by the user. The carrying handle 6A is advantageously designed to project from the lid 3 in the deployed position, and to be folded away against the lid 3 in the retracted position, as shown in the figures.

The use of a control member 6 in the form of a carrying handle 6A is particularly preferred because it enables the user to take hold of it particularly firmly and with particular assurance, while also being easy to retract. Preferably, the control member 6 substantially has a circularly arcuate outline, as shown in the figures. In which case, said carrying handle 6A advantageously extends around a substantially semicircular outline between a first end 60 and a second end 61 through which ends said pivot axis Y-Y' substantially passes, said first and second ends 60, 61 thus being disposed to be substantially diametrically opposite about the axis X-X'. In other words, the carrying handle 6A substantially has the shape of an arch corresponding advantageously to a semicircle whose diameter is chosen to enable the user to slip at least two fingers (e.g. the index finger and the middle finger), and preferably at least three fingers (index, middle, and ring fingers), into the orifice 6B defined by said arch and by the lid 3, a space sufficient for enabling four fingers (index, middle, ring, and little fingers) to be inserted being preferred.

Figure 14:
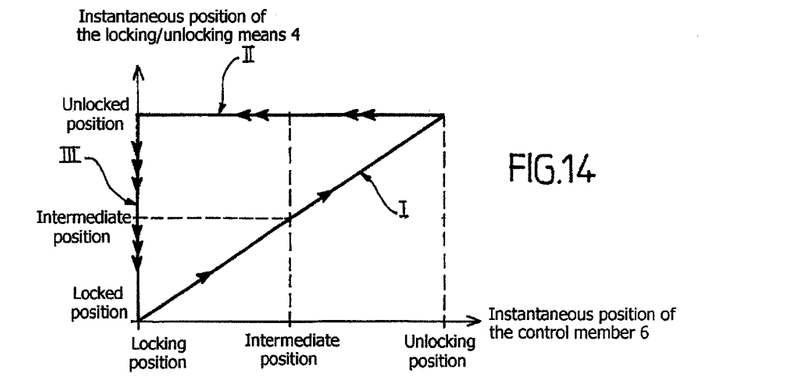
FIG. 14 is a graph showing how the instantaneous position of the locking/unlocking means varies as a function of the instantaneous position of the control member for a utensil similar to the utensil of FIGS. 1 to 13.

In accordance with the invention, the control member 6 and the locking/unlocking means 4 co-operate so that the instantaneous position of the locking/unlocking means 4 varies as a function of the instantaneous position of the control member 6 in a first relationship while the control member 6 is being moved from its locking position to its unlocking position. In other words, the control member 6 moving from its locking position towards and into its unlocking position causes the locking/unlocking means 4 to move from their locked position towards and into their unlocked position in a specific mode of movement that can be expressed by a mathematical expression relating the instantaneous position of the locking/unlocking means 4 to the instantaneous position of the control member 6. This means that the instantaneous position of the locking/unlocking means 4 is a function of the instantaneous position of the control member 6, this function corresponding to said first relationship while the control member 6 is being moved from its locking position towards its unlocking position. Advantageously, said first relationship constrains the distance between the instantaneous position of the locking/unlocking means and the locked position thereof to increase with increasing distance between the instantaneous position of the control member 6 and the locking position thereof. In other words, the control member 6 moving from its locking position towards its unlocking position causes the locking/unlocking means 4 to move concomitantly from their locked position to their unlocked position. Thus, the locking/unlocking means 4 move progressively closer to their unlocked position as the control member 6 moves closer to its unlocking position. The first relationship is thus advantageously a monotonic function, and more precisely an increasing function relating the instantaneous position of the control member 6, as antecedent, to the instantaneous position of the locking/unlocking means 4 as consequent in the mathematical sense of the terms. Advantageously, the first relationship constrains the distance between the instantaneous position of the locking/unlocking means 4 and the locked position thereof to vary proportionally to the distance between the instantaneous position of the control member 6 and the locking position thereof. In other words, the instantaneous position of the locking/unlocking means 4 is related to the instantaneous position of the control member 6 by a linear function that is shown in FIG. 14 by the straight line I identified by single arrows, which arrows show the direction in which the control member 6 moves from its locking position to its unlocking position.

Achieving such progressive movement of the locking/unlocking means 4 towards their unlocked position under the effect of the control member 6 moving progressively from its locking position towards its unlocking position is well known per se, and can, for example, be obtained by mechanical coupling means for mechanically coupling together the control member 6 and the locking/unlocking means 4, which coupling means are well known and are described in more detail below.

In accordance with the invention, the control member 6 and the locking/unlocking means 4 co-operate so that the instantaneous position of the locking/unlocking means 4 varies as a function of the instantaneous position of the control member 6 in a second relationship that is different from the first relationship while the control member 6 is being moved from its unlocking position towards its locking position.

In other words, while the control member 6 is being moved from its unlocking position towards and into its locking position, it imparts movement to the locking/unlocking means 4 that is different from the movement that it imparted in the opposite direction, i.e. while the control member 6 was moving from its locking position towards its unlocking position. The mathematical function, corresponding to the second relationship, relating the instantaneous position of the locking/unlocking means 4 to the instantaneous position of the control member 6 is thus different from the mathematical function corresponding to the first relationship. In other words, from this point of view, the invention consists in establishing, between the locking/unlocking means 4 and the control member 6, a mechanical coupling that is different depending on whether the control member 6 is actuated to move from its locking position to its unlocking position, or, conversely, to move from its unlocking position towards its locking position. This means that, while it is moving from its locking position to its unlocking position and vice versa, the control member 6 goes through at least one intermediate position to which at least two distinct positions of the locking/unlocking means 4 correspond, the first of these position being reached while the control member 6 is moving from its locking position to its unlocking position, while the second position is reached while the control member 6 is moving from its unlocking position to its locking position. In the example shown in the figures, one example of such an intermediate position of the control member 6 thus, in the unlocking direction, corresponds to an intermediate position of the locking/unlocking means 4 through which said locking/unlocking means pass while going from their locked position to their unlocked position, and, in the locking direction, corresponds to the unlocked position of the locking/unlocking means 4.

From this point of view, the invention can thus be defined as relating to a food-cooking utensil 1 including:

locking/unlocking means 4 mounted to move between a locked position in which they lock the lid 3 relative to the vessel 2 and an unlocked position in which the lid to 3 is free relative to the vessel 2; and a control member 6 for controlling the movement of said locking/unlocking means 4, said control member 6 itself being mounted to move between a locking position and an unlocking position, which positions correspond respectively to the locked and to the unlocked positions of said locking/unlocking means 4, said control member 6 going through an intermediate position while it is moving from its locking position to its unlocking position and vice versa;

the control member 6 and the locking/unlocking means 4 co-operating so that when the control member 6 reaches said intermediate position from its locking position, the locking/unlocking means 4 are in a first position, whereas, when the control member 6 reaches said intermediate position from its unlocking position, the locking/unlocking means 4 are in a second position that is different from the first position.

The invention thus makes it possible to make the stroke of the locking/unlocking means 4 differ depending on whether they are being driven into the locked position or into the unlocked position, thereby giving an operating indication to the user and facilitating use of the utensil, without it being necessary to use two distinct members for controlling firstly locking and secondly unlocking. In other words, the locking/unlocking cycle presents hysteresis.

Advantageously, and as shown in FIG. 14, said second relationship constrains the locking/unlocking means 4 to remain in the unlocked position so long as the control member 6 has substantially not reached its locking position, the locking/unlocking means 4 returning to their locked position only once the control member 6 substantially reaches its locking position. This second relationship is shown diagrammatically by the curves II and III of FIG. 14, respectively identified by double arrows and by triple arrows showing the direction of movement of the control member 6.

Thus, by means of the specific drive movement that said second relationship constrains the locking/unlocking means 4 to undergo, the utensil 1 is locked in clear-cut and substantially non-progressive manner, unlike unlocking which is advantageously progressive, thereby making it possible for the user to perceive clearly that the locking operation has been effected correctly. Such clear-cut closure, which implies that the jaws 4A, 4B are retracted suddenly into the locked position, can also audibly inform the user of the locking, the sudden nature of the locking being conducive to generating an impact noise (e.g. of the jaws 4A, 4B against the side edge of the lid 3) that is characteristic of locking.

Naturally, the invention is absolutely not limited to a utensil 1 implementing locking/unlocking drive movements solely as shown in the graph of FIG. 14. For example, it is quite possible for the straight line I to be replaced with a curve of any shape, and the same applies for the straight lines II and III.

Advantageously, the locking/unlocking means 4 are caused to move by the control member 6 via a transmission part 14 interposed between said locking/unlocking means 4 and said control member 6, said transmission part 14 being mounted to move relative to said locking/unlocking means 4 and to said control member 6 between a first position corresponding to the unlocked position of the locking/unlocking means 4 and a second position corresponding to the locked position of the locking/unlocking means 4. The transmission part 14 is thus advantageously distinct both from the locking/unlocking means 4 and form the control member 6, and is connected functionally to said locking/unlocking means 4 and the control member 6 so as to transmit the movement of the control member 6 and preferably so as to convert it into movement of the locking/unlocking means 4.

The use of such an intermediate part is particularly advantageous insofar as it facilitates the use of the general principle underlying the invention, namely implementation of a relationship for movement of the locking/unlocking means 4 that changes with changing direction of movement of the control member 6. The use of such an intermediate part, constituted by the transmission part 14, also makes it possible to obtain force reduction effects for making it easier for the user to operate the utensil 1.

Figure 13:
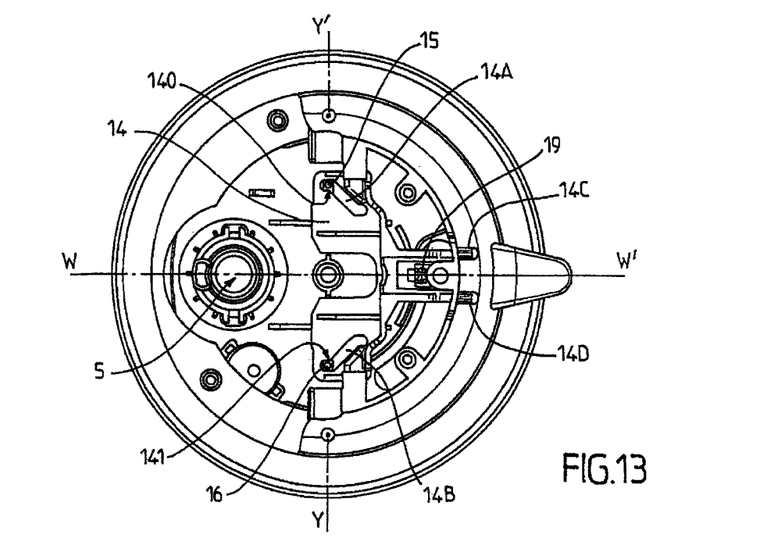
FIG. 13 is a view from above of the implementation detail of FIG. 12, the control member being omitted for reasons of clarity.

Preferably, the transmission part 14 is constituted by an intermediate control plate that extends mainly in a mean plane of extension that is parallel to the mean plane of extension of the lid 3, said mean plane itself being parallel to the plane of the sheet on which FIG. 13 is drawn, for example.

Preferably, the transmission part 14 is mounted to move in translation over the lid 3 along a translation axis W-W', which axis is preferably substantially perpendicular to the pivot axis Y-Y'. Thus, the slide axis Z-Z', the translation axis W-W', and the pivot axis Y-Y advantageously extend in respective planes that are all parallel to one another, and that can optionally coincide with one another, in which case the axes in question W-W', Y-Y', and Z-Z' are co-planar.

Advantageously, the second position of the transmission part 14 (shown in FIGS. 3 and 4) that corresponds to the locked position of the locking/unlocking means 4, is a return position.

This means that the transmission part 14 is advantageously urged continuously and resiliently back into its second position, which position thus constitutes a stable equilibrium position. Such return action for urging the transmission part 14 back into its second position is, for example, obtained by means of a return spring 19 (visible in the views from above of FIGS. 4, 6, 9, and 13) that continuously pushes the transmission part 14 back towards its second position. More precisely, the transmission part 14 is advantageously mounted to move in translation along the axis W-W' on a plate 10 that is itself fastened to the lid 3, the return spring 19 being interposed between the plate 10 and the transmission part 14 so as to push said transmission part back continuously towards its second position.

Advantageously, the first position of the transmission part 14 is an unstable equilibrium position, outside of which the transmission part 14 is urged into its second position. In other words, the utensil 1 is provided with means making it possible to hold the transmission part 14 stationary in its first position. Conversely, when, under suitable drive, the transmission part 14 is moved away from its second position, said transmission part 14 does not return naturally to its first position, but rather it is urged back into its second position, e.g. under drive from the return spring 19.

Advantageously, the control member 6 and the transmission part 14 co-operate so that, while it is moving from its locking position to its unlocking position (straight line I of the graph of FIG. 14), the control member 6 exerts a force on the transmission part 14 that drives said transmission part from its second position to its first position, the transmission part 14 itself driving the locking/unlocking means 4 back from their locked position to their unlocked position.

Preferably, as shown in the figures, the control member 6 is, for this purpose, provided with at least one cam (and with two cams 12, 13 in the example shown in the figures) against which the transmission part 14 is urged back continuously when it is not in its first position. Advantageously, the control member 6 is provided with two cams 12, 13 mounted at respective ones of the ends 60, 61 of the carrying handle 6A forming the control member 6.

The transmission part 14 is advantageously returned against the cam 12, 13 by the same spring 19, i.e. the spring that urges the transmission part 14 back into its second position. The spring 4E that urges the drive arms 4C, 4D back into the locked position may also contribute to exerting a return force on the transmission part 14, as is well known per se.

Advantageously, the cam 12, 13 is designed to push the transmission part 14 towards its first position under the effect of the control member 6 moving towards its unlocking position.

In the embodiment shown in the figures, each cam 12, 13 pivots with the carrying handle 6A about the axis Y-Y', this pivoting of each cam 12, 13 making it possible for said cams to act by means of them being asymmetric about the axis Y-Y' to push the transmission part 14 away towards and into its first position under the effect of the control member 6 moving from its locking position to its unlocking position. Once the transmission part 14 has reached its first position, said transmission part 14 is held stationary in said first position by any suitable means, and, for example, by means that are described in more detail below.

Advantageously, the control member 6 and the transmission part 14 co-operate so that while the control member 6 is moving from its unlocking position towards its locking position, and so long as it has not reached said locking position, said control member 6 substantially does not exert any force on the transmission part 14 that might drive said transmission part out of its first position; and as soon as the control member 6 reaches its locking position from its unlocking position, said control member 6 exerts a force on the transmission part 14 that is sufficient for said transmission part to leave its first position, and then advantageously to be returned automatically towards and into its second position, as explained above, thereby suddenly and concomitantly causing the lid 3 to be locked onto the vessel 2.

Such operation is advantageously obtained by the control member 6 and the transmission part 14 being coupled together merely by bearing against each other, thereby enabling the transmission part 14 to be pushed back into its first position and then, once said first position has been reached, allowing the control member 6 to return to its locking position without exerting any force on the transmission part 14, to which it was coupled merely by freely bearing thereagainst.

Operation of the particular variant shown in the figures is described chronologically below.

Firstly, the utensil 1 is in the cooking configuration, i.e. its lid 3 is mounted and locked on the vessel 2 by the locking/unlocking means 4.

In this configuration, shown in FIGS. 1 to 4, the control member 6, comprising the carrying handle 6A in this example, finds itself in the locking position.

Figures 4, 5, 6:
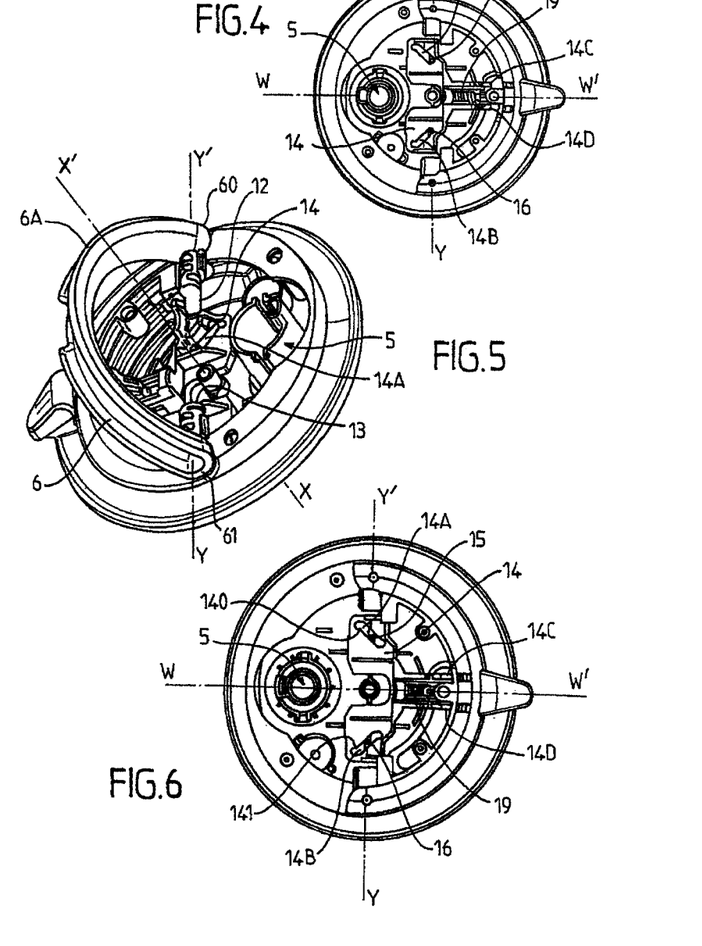
FIG. 4 is a view from above of the implementation detail of FIG. 3.
FIG. 5 is a perspective view of the implementation detail of FIG. 3 once the control member has left its locking position and is moving towards its unlocking position.
FIG. 6 is a view from above of the implementation detail of FIG. 5, the control member being omitted for reasons of clarity.

At the end of the cooking cycle, and once the utensil 1 is depressurized by any known means, it is possible for the user, subject to the opening safety means allowing the utensil 1 to be opened, to bring the carrying handle 6A back into its unlocking position, by pivoting it through an angular stroke of 90° clockwise about the pivot axis Y-Y'. This path from the locking position to the unlocking position is shown in FIGS. 5 and 6. The carrying handle 6A being pivoted from its locking position to its unlocking position causes the pair of cams 12, 13 to move concomitantly in rotation, the pair of cams being mounted at respective ones of the first and second ends 60, 61 of the carrying handle 6A. Each cam 12, 13 thus comes to push simultaneously on the transmission part 14 that was initially in its second position. Under the effect of the thrust exerted, via the cams 12, 13 freely bearing on the transmission part 14, said transmission part 14 moves in translation over the plate 10 along the translation axis W-W that is perpendicular both to the pivot axis Y-Y' and to the overall axis of symmetry X-X'. In order to guarantee continuous operating contact between the cams 12, 13 and the transmission part 14 (which are coupled together merely by bearing against each other), said transmission part is subjected to the action of the return spring 19 that continuously pushes the transmission part 14 against said cams 12, 13.

The control part 14 is advantageously provided with slots 14A, 14B that extend in slanting manner and symmetrically about the translation axis W-W'. Said slanting slots 14A, 14B co-operate with lugs 15, 16 connected to respective ones of the drive arms 4C, 4D towards the inner ends thereof.

Thus, the transmission part 14 moving in translation acts, via the slots 14A, 14B, to cause the lugs 15, 16 to move radially outwards, and thus to cause the drive arms 4C, 4D to which said lugs are respectively attached to move radially outwards. Such a principle for controlling the radial movement of the drive arms 4C, 4D is well known per se, and is described, for example, in Document FR-2 863 849 A1 the content of which is incorporated herein by way of reference.

Thus, during this unlocking stage obtained by the carrying handle 6A pivoting through 90° from its locking position to its unlocking position, the transmission part 14 transforms the pivoting movement of the carrying handle 6A about the axis Y-Y''' into a movement in outward radial translation of the drive arms 4C, 4D, thereby moving the jaws 4A, 4B away from the rolled rim of the vessel 2. The carrying handle 6A continues along its path until it reaches an abutment position (shown, for example, in FIGS. 7, 8, and 10) in which said carrying handle 6A extends vertically above the lid 3. This position corresponds to the jaws 4A, 4B being mutually spaced apart to the maximum extent, corresponding to the unlocking position. The control member 6 going from its locking position to its unlocking position, and the locking/unlocking means 4 correspondingly going from their locked position to their unlocked position is shown by the straight line I of FIG. 14, which shows that the jaws 4A, 4B open progressively as the carrying handle 6A pivots from its locking position to its unlocking position. Once the carrying handle 6A is in the unlocking position, the locking/unlocking means 4 themselves reach their unlocked position. The unlocking position of the control member 6 is advantageously a stable position, e.g. by means of the action of slidably mounted vertical studs 17, 18 that penetrate into suitable complementary shapes provided in the carrying handle 6A, towards the corresponding ends 60, 61 thereof.

For this purpose, each stud 17, 18 is mounted to move in vertical translation on the plate 10, and is subjected to the action of a corresponding return spring 17A, 18A that pushes the respective stud 17, 18 against the carrying handle 6A and thus holds said carrying handle in its unlocking position. For example, in order to facilitate stowing the lid 3 or placing it in a dishwasher, the user can then fold the carrying handle 6A away, i.e. to cause it to return to its locking position.

Figures 10, 11:
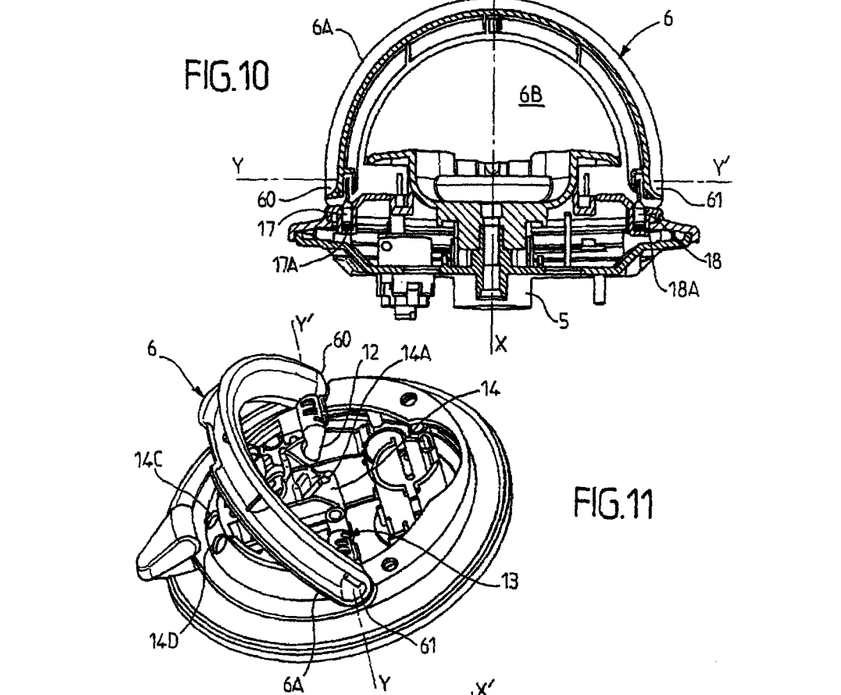
FIG. 10 is a section view of the implementation detail of FIG. 8.
FIG. 11 is a perspective view of the implementation detail of FIGS. 8 to 10 once the control member has left its unlocking position and is moving towards its locking position.
Figure 12:
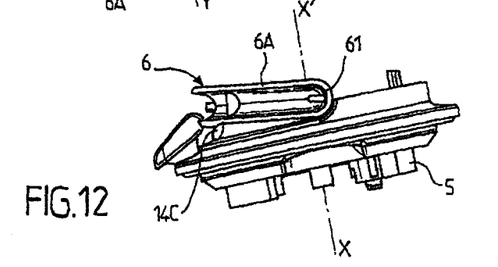
FIG. 12 is a side view of the implementation detail of FIG. 11, the control member being about to reach its locking position.

For this purpose, the user causes the carrying handle 6A to pivot anticlockwise through 90° from its unlocking position into its locking position. This path is shown by FIGS. 11 and 12, and by the straight lines II and III of FIG. 14. As soon as the carrying handle 6A has left its locking position, the contact between the cams 12, 13 and the transmission part 14 ceases, as is particularly visible in FIG. 11. Under the effect of the pivoting about the axis Y-Y', the active portion of each cam 12, 13 moves away from the transmission part 14, which part is held stationary in its unstable equilibrium first position. The transmission part 14 is advantageously held stationary in its first position by suitable shaping of the slots 14A, 14B that form slight bends 140, 141 making it possible, by co-operating with the return action exerted by the spring 4E on the stud 15, 16, to hold the transmission part 14 stationary. Such shaping of the slots 14A, 14B for holding such a transmission part 14 stationary is well known per se, and therefore does not need any further description herein. As it approaches its locking position, as shown in FIG. 12, the carrying handle 6A comes to bear on a trigger constituted, in this example, by two rounded ribs 14C, 14D that are integral with the transmission part 14. By bearing on said ribs 14C, 14D, the carrying handle 6A pushes the transmission part 14 in translation along the translation axis W-W' out of its unstable equilibrium first position so that, under the action of the spring 19 and optionally under the action of the return spring urging the drive arms 4C, 4D back towards each other, the transmission part 14 is suddenly propelled to its position corresponding to the lid 3 being locked onto the vessel 2. This sudden locking movement is shown by the substantially vertical straight line III of the graph of FIG. 14.

The utensil 1 of the invention is thus advantageously progressive for unlocking, and bistable for locking. It is thus possible, by pivoting the carrying handle 6A through one quarter of a turn, to go from a stable locking state to a stable unlocking state by the various elements making up the above-described locking/unlocking mechanism moving in progressive and servo-controlled manner, movement of the carrying handle 6A in the opposite direction triggering going over from the unlocked state to the locked state only at the end of the angular stroke of the arch 6A, by automatic triggering of the locking as described above.

SUSCEPTIBILITY OF INDUSTRIAL APPLICATION

The invention finds industrial application in the design, fabrication and use of cooking utensils, especially of utensils for cooking under pressure of the pressure cookers type.

What is claimed is:

1. A food-cooking utensil comprising:
    a vessel and a lid;
    locking/unlocking means mounted to move between a locked position in which the locking/unlocking means lock the lid to the vessel and an unlocked position in which the lid is free relative to the vessel; and
    a control member for controlling the movement of the locking/unlocking means, the control member being mounted to enable a user to move the control member back and forth between (i) a locking position, which causes the locking/unlocking means to move to the locked position in which the locking/unlocking means lock the lid to the vessel, and (ii) an unlocking position, which causes the locking/unlocking means to move to the unlocked position in which the lid is free relative to the vessel, the unlocking position of the control member being a stable position in which the control member remains in the stable position without the user interacting with the control member and until force is applied manually to move the control member out of said stable position,
    wherein while the control member is being moved from its locking position towards its unlocking position, the control member and the locking/unlocking means co-operate so that the instantaneous position of the locking/unlocking means varies as a function of the instantaneous position of the control member in a first relationship,
    wherein while the control member is being moved from its unlocking position towards its locking position, the control member and the locking/unlocking means co-operate so that the instantaneous position of the locking/unlocking means varies as a function of the instantaneous position of the control member in a second relationship that is different from the first relationship, and
    wherein in the second relationship in which the control member is being moved from its unlocking position towards its locking position, the locking/unlocking means remains stationary in its unlocked position until the control member reaches its locking position and, upon the control member reaching its locking position from its unlocking position, the control member causes the locking/unlocking means to move into its locked position from its stationary unlocked position to lock the lid to the vessel.

2. The utensil according to claim 1, wherein in said first relationship, a distance between the instantaneous position of the locking/unlocking means and the locked position thereof increases with increasing distance between the instantaneous position of the control member and the locking position thereof.

3. The utensil according to claim 2, wherein in said second relationship, the locking/unlocking means remains in the unlocked position so long as the control member has substantially not reached its locking position.

4. The utensil according to claim 2, wherein said locking/unlocking means are configured to move by said control member via a transmission part interposed between said locking/unlocking means and said control member, said transmission part being configured to move relative to said locking/unlocking means and to said control member between a first position corresponding to the unlocked position and a second position corresponding to the locked position.

5. The utensil according to claim 1, wherein in said second relationship, the locking/unlocking means remains in the unlocked position so long as the control member has substantially not reached its locking position.

6. The utensil according to claim 5, wherein said locking/unlocking means are configured to move by said control member via a transmission part interposed between said locking/unlocking means and said control member, said transmission part being mounted to move relative to said locking/unlocking means and to said control member between a first position corresponding to the unlocked position and a second position corresponding to the locked position.

7. The utensil according to claim 1, wherein said locking/unlocking means are configured to move by said control member via a transmission part interposed between said locking/unlocking means and said control member, said transmission part being mounted to move relative to said locking/unlocking means and to said control member between a first position corresponding to the unlocked position and a second position corresponding to the locked position.

8. The utensil according to claim 7, wherein the second position of the transmission part is a return position, whereas the first position is an unstable equilibrium position outside of which the transmission part is urged back into its second position.

9. The utensil according to claim 8, wherein said control member includes at least one cam against which the transmission part is urged back continuously whenever it is not in its first position, said cam being designed to push the transmission part towards its first position under the effect of the control member moving towards its unlocking position.

10. The utensil according to claim 8, wherein the control member and the transmission part are configured to co-operate so that, while said control member is moving from its locking position to its unlocking position, the control member exerts a force on the transmission part that drives said transmission part from its second position to its first position.

11. The utensil according to claim 8, wherein the control member and the transmission part are configured to co-operate so that:
while the control member is moving from its unlocking position towards its locking position and so long as it has not reached said locking position, said control member does not exert any force on the transmission part that might drive said transmission part out of its first position; and
when the control member reaches its locking position from its unlocking position, said control member exerts a force on the transmission part causing said transmission part to leave its first position.

12. The utensil according to claim 7, wherein the control member and the transmission part co-operate so that, while said control member is moving from its locking position to its unlocking position, the control member exerts a force on the transmission part that drives said transmission part from its second position to its first position.

13. The utensil according to claim 12, wherein said control member includes at least one cam against which the transmission part is urged back continuously whenever it is not in its first position, said cam being designed to push the transmission part towards its first position under the effect of the control member moving towards its unlocking position.

14. The utensil according to claim 12, wherein the control member and the transmission part are configured to co-operate so that:
while the control member is moving from its unlocking position towards its locking position and so long as it has not reached said locking position, said control member does not exert any force on the transmission part that might drive said transmission part out of its first position; and
when the control member reaches its locking position from its unlocking position, said control member exerts a force on the transmission part causing said transmission part to leave its first position.

15. The utensil according to claim 7, wherein the control member and the transmission part co-operate so that:
while the control member is moving from its unlocking position towards its locking position and so long as it has not reached said locking position, said control member does not exert any force on the transmission part that might drive said transmission part out of its first position; and
when the control member reaches its locking position from its unlocking position, said control member exerts a force on the transmission part causing said transmission part to leave its first position.

16. The utensil according to claim 7, wherein the transmission part is mounted to move in translation on the lid along a translation axis,
said control member is mounted to pivot on the lid about a pivot axis, and said pivot axis is substantially perpendicular to said translation axis.

17. The utensil according to claim 1, wherein said control member is mounted to pivot on the lid about a pivot axis.

18. The utensil according to claim 1, wherein the locking/unlocking means are mounted to slide along a slide axis to clamp/unclamp the lid.

19. The utensil according to claim 1, wherein the utensil constitutes a pressure cooker.

20. A food-cooking utensil comprising:
a vessel and a lid;
locking/unlocking means mounted to move between a locked position in which the locking/unlocking means lock the lid to the vessel and an unlocked position in which the lid is free relative to the vessel; and
a control member for controlling the movement of the locking/unlocking means, the control member being mounted to enable a user to move between a locking position and an unlocking position, which positions correspond respectively to the locked and to the unlocked positions of said locking/unlocking means;
wherein while the control member is being moved from its locking position towards its unlocking position, the control member and the locking/unlocking means co-operate so that the instantaneous position of the locking/unlocking means varies as a function of the instantaneous position of the control member in a first relationship,
wherein while the control member is being moved from its unlocking position towards its locking position, the control member and the locking/unlocking means co-operate so that the instantaneous position of the locking/unlocking means varies as a function of the instantaneous position of the control member in a second relationship that is different from the first relationship.

* * * * *